United States Patent
Aoyagi et al.

[19]

[11] Patent Number: 5,978,205
[45] Date of Patent: Nov. 2, 1999

[54] CAPACITOR HAVING STEP PARTS, A GAP, AND RECESSED PARTS

[75] Inventors: Takuji Aoyagi; Tetsuo Tatsuno, both of Tokyo, Japan

[73] Assignee: Taiyo Yuden Co., Ltd., Tokyo, Japan

[21] Appl. No.: 08/922,777

[22] Filed: Sep. 3, 1997

[30] Foreign Application Priority Data

Sep. 9, 1996 [JP] Japan ..................................... 8-260293

[51] Int. Cl.$^6$ ............................ H01G 4/005; H01G 4/06; H01G 4/38
[52] U.S. Cl. ............................ 361/303; 361/329; 361/311
[58] Field of Search .................................. 361/301.1, 303, 361/306.1, 311, 321.1–321.5, 321.6, 329, 306.3, 307, 308.1, 301.3; 29/25.41, 25.42

[56] References Cited

U.S. PATENT DOCUMENTS

| | | | |
|---|---|---|---|
| 3,689,811 | 9/1972 | Hoffman | 361/314 |
| 3,914,666 | 10/1975 | Schmickl et al. | 361/329 |
| 4,591,947 | 5/1986 | Bagley et al. | 361/310 |
| 5,053,916 | 10/1991 | Weekamp et al. | 361/308 |

FOREIGN PATENT DOCUMENTS

| | | | |
|---|---|---|---|
| 403109706 | 5/1991 | Japan | 361/321.6 |
| 403232211 | 10/1991 | Japan | 361/321.6 |

*Primary Examiner*—Hyung-Sub Sough
*Assistant Examiner*—Anthony Dinkins
*Attorney, Agent, or Firm*—Flynn, Thiel, Boutell & Tanis, P.C.

[57] ABSTRACT

When step parts are formed such that the surfaces of a capacitor element drop down on both the sides of a part served as a gap and the capacitor element is soaked into a conductive paste, the step parts are designed to interrupt the conductive paste to flow up. And, the conductor film is adhered also on the step parts. Thereby, the edges of the electrodes made of the conductor film are not only opposed each other with the gap interpolated therebetween, but also opposed electrodes are formed on the parts of the step parts. Thereby, a high capacitance can be acquired. Further, a resin is coated on a part where an insulating coating is formed, and the resin flows into recessed parts adjacent to the step parts. Therefore, the outside diameter of the insulating coating does not extremely increase.

6 Claims, 5 Drawing Sheets

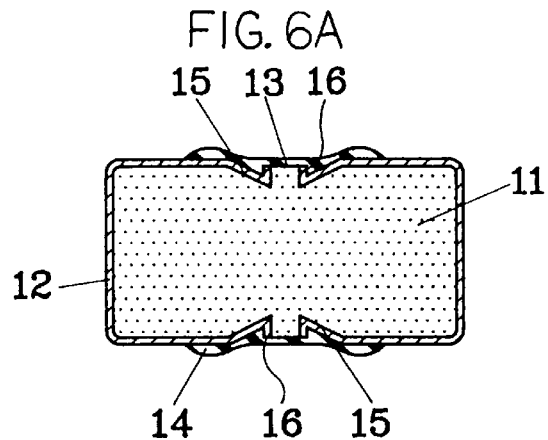
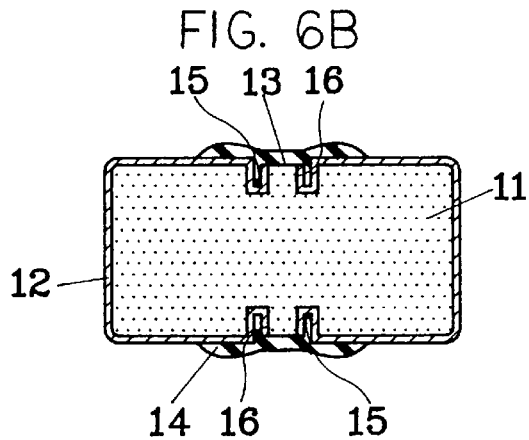
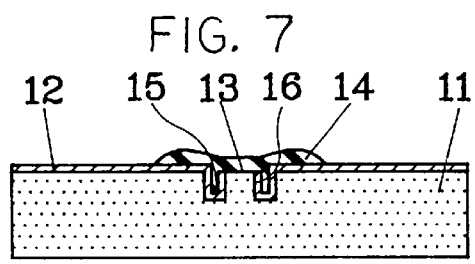
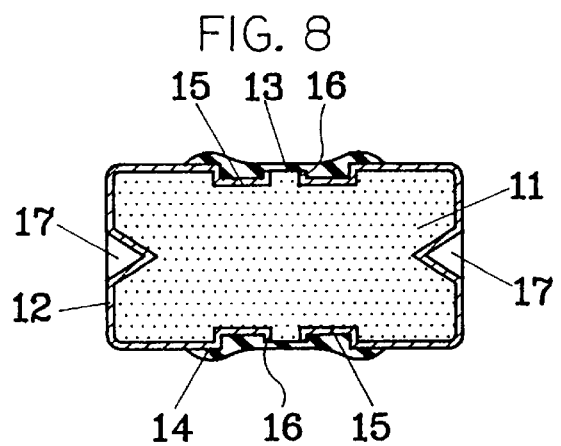

CAPACITOR HAVING STEP PARTS, A GAP, AND RECESSED PARTS

BACKGROUND OF THE INVENTION

1. Field of the Invention

The present invention relates to a capacitor in which at least one or more pairs of opposed electrodes are formed so as to interpolate a gap therebetween on the surfaces of a capacitor element made of a dielectric substance or the like, and a method of manufacturing the same.

2. Description of the Related Art

A capacitor having a pair of opposed electrodes formed so as to interpolate a gap on the surfaces of a dielectric substance is disclosed, for example, in the Japanese Patent Application Laid Open no. 3-232211. FIG. 12 and FIG. 13 illustrate this example. Such a conventional capacitor is formed such that a ceramic dielectric substance 1 of a cylindrical shape or the like is provided with a pair of electrodes 2, 2 on both the sides of a gap 3 formed on the center of the circumference thereof. The gap 3 and the electrodes 2, 2 are formed all along the circumference of the dielectric substance 1, and the electrodes 2, 2 are separated completely by the gap 3. Further, in the example of FIG. 12, an insulating coating 1 made of a resin or the like overlies a part near the edges of the electrodes 2, 2 as to oppose with the gap 3 interpolated therebetween. The electrodes 2, 2 on both the end parts of the dielectric substance 11 are exposed as the terminal parts from the insulating coating 4, however, these terminal parts can be overlaid with the other conductor layers, or can be engaged with conductor caps.

Next, the method of manufacturing this type of capacitor will be described. First, a cylindrical capacitor element 1 of a dielectric substance is prepared, on the whole surface of which a conductor film is overlain. This conductor film is formed such that a conductor paste is applied on the surface of the capacitor element 1 and baked, or the conductor film is made by plating. Next, this conductor film is trimmed by the laser trimming, and a narrow gap 3 is formed along the whole circumference of the capacitor element 1. Thereby, the conductor film is separated into a pair of the electrodes 2, 2. FIG. 13 illustrates a state thus separated. Thereafter, the insulating coating 4 and the like are formed as needed, thus producing a capacitor as shown in FIG. 12.

Further, another method of forming the electrodes 12, 12 is adopted, in which both the ends of the capacitor element 1 are soaked into the conductive paste so as not to soak the part of the gap 13 therein, and the capacitor element 1 having the conductive paste applied is baked to form the electrodes.

In the former method of manufacturing a capacitor, the conductor film formed on the surface of the capacitor element 1 has to be removed with a high preciseness by the laser trimming on the center along the whole circumference. In performing this, it is necessary to hold and rotate a small chip capacitor element 1, which needs an additional man-hour on the process.

Further, in the latter method of manufacturing a capacitor, due to the dispersion of the dimension of the capacitor element 1 or the dispersion of the soaking depth when the capacitor element 1 is soaked into the conductive paste or the like, the dimension of the gap 3 is dispersed, which does not give a high preciseness to the dimension. In this type of capacitor, the part of the gap 3 where the electrodes 2, 2 are opposed makes a capacitance, and if the dimension accuracy of the gap 3 is insufficient, the accuracy of the capacitance becomes also insufficient which is an important characteristic value for a capacitor.

Further, the foregoing insulating coating 4 is formed such that a resin is applied usually by the roll coating method and is hardened. However, due to the surface tension of the applied resin, the center part of the resin swells, and the resin is hardened as it is. Therefore, the center part of the insulating coating 4 swells in thickness, which makes the outer shape of the capacitor into the so-called barrel shape. Accordingly, when mounting the capacitor on a circuit board and soldering the electrodes 2, 2 of both the ends of the capacitor on land electrodes on the circuit bord, defective solderings are apt to be created such that the electrodes 2, 2 are placed afloat from the land electrodes to cause both the electrodes 2, 2 not to be soldered, and one of the electrodes 2, 2 is not soldered to make the one electrode 2 face upward.

SUMMARY OF THE INVENTION

The present invention has been made in view of the foregoing problems, and it is therefore an object of the present invention to provide a capacitor and a method of the same, whereby, even in the so-called dip coating in which both the ends of the capacitor element are soaked into a conductive paste and the paste is coated, a gap with a high-precision constant width can be formed and the diameter of the insulating coating does not swell and further a high capacitance can be acquired.

In order to accomplish the foregoing object, the capacitor according to the present invention is formed in the following construction. Step parts 16, 16 are formed such that the surfaces of a capacitor element 11 drop down on both the sides of a part served as a gap 13 of a capacitor element 11. When a conductive paste is applied by the dip coating, the falling edges of the step parts 16, 16 functions as deterring the conductive paste from climbing over the edges. The conductor film is adhered also on the step parts 16, 16, and thereby, the edges of the electrodes 12, 12 made of the conductor film are not only opposed so as to interpolate the gap 13 therebetween, but opposed electrodes are also formed on the step parts 16, 16 of the electrodes 12, 12, which produces a higher capacitance. Further, since the foregoing step parts 16, 16 are formed such that the surfaces of the capacitor element 11 drop down, when a resin is applied in the parts to form an insulating coating 14, the resin flows into recessed parts 15, 15 adjacent to the step parts 16, 16; and therefore, the outside diameter of the insulating coating does not extremely increase.

Namely, the capacitor according to the invention is characterized in that the step parts 16, 16 are formed such that the surfaces of the capacitor element 11 drop down on both the sides of the gap 13, and the electrodes 12, 12 made of the conductor film are formed so as to be opposed with the gap 13 interpolated therebetween on both the sides of the step parts 16, 16. And, the electrodes 12, 12 made of the conductor film are formed on the step parts 16, 16.

The step parts 16, 16 are formed, for example, by rising surfaces of recessed parts 15, 15 formed on the surface of the capacitor element 11. The capacitor element 11 may be columnar or of a plate. In case the capacitor element 11 is columnar, the step parts 16, 16 are formed on the circumferences of the capacitor element 11. In case the capacitor element 11 is of a plate, the step parts 16, 16 are formed on the flat surfaces of the capacitor element 11.

Such a capacitor is made by the processes of: forming the step parts 16, 16 such that the surfaces of the capacitor element 11 drop down on both the sides of the gap 13, and forming the electrodes 12, 12 made of the conductor film on both the sides of the step parts 16, 16 so as to be opposed with the gap 13 interpolated therebetween. Here, the process of forming the electrodes 12, 12 made of the conductor film on the surfaces of the capacitor element 11 adopts the so-called dip coating method, in which the end sides of the capacitor element 11 viewing from the step parts 16, 16 are soaked into a conductive paste a by one end side at a time. In this case, it is possible to soak the end side of the capacitor element 11 into the conductive paste a, serving the foregoing step part 12 as a guide. And if the end side is soaked into the paste a little deeper than the guide, the conductive paste a is interrupted at the step part 12 by the surface tension of the conductive paste a. Accordingly, the conductive paste a does not wet the part upper than the step part, and the gap 13 can always be formed with a specific width.

Thus, in the capacitor according to the invention, even in the so-called dip coating method in which both the ends of the capacitor element 11 are soaked into a conductive paste a and the paste a is coated, a gap 13 having a high-precision constant width interpolated between the electrodes 12, 12 can be formed and the diameter of the insulating coating 14 does not swell and further a high capacitance can be acquired.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

Figure 3:
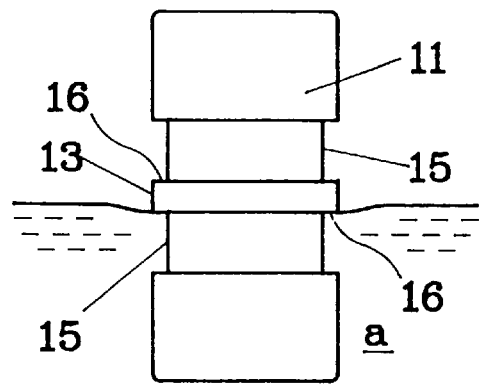
Figure 4:
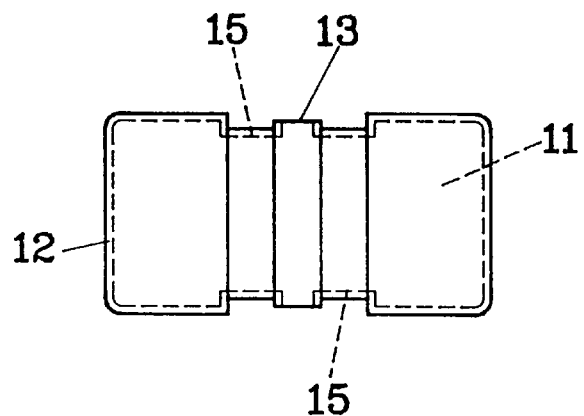
Figure 9:
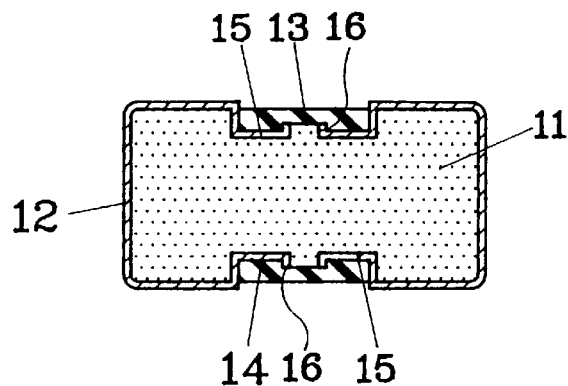
Figure 12:
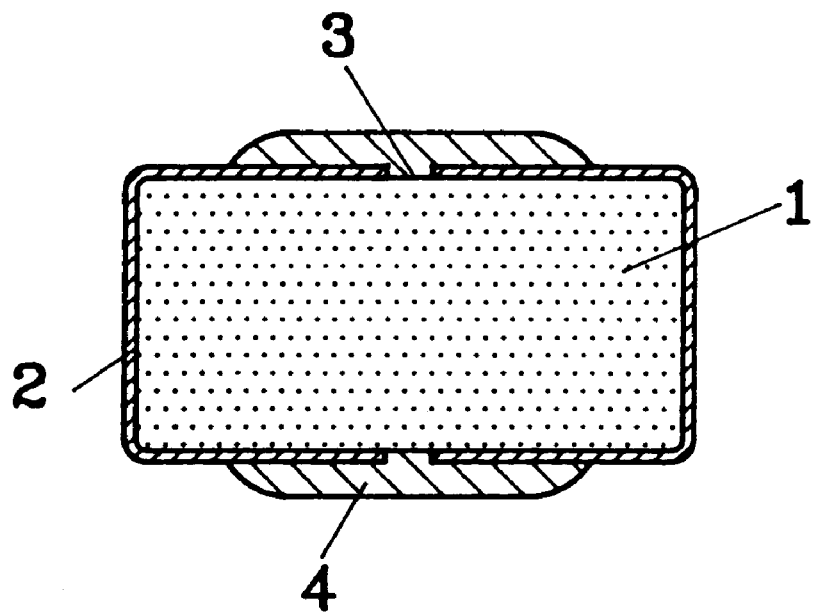
Figure 13:
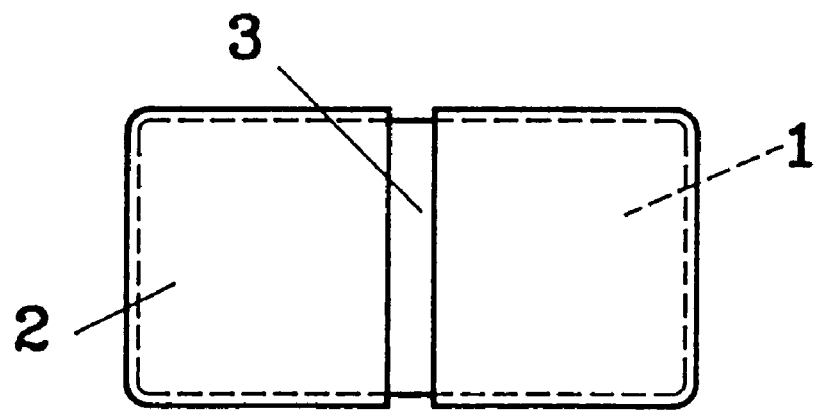

FIGS. (2a–2c) are longitudinal sectional view showing a state of the process of manufacturing the capacitor;

FIG. 3 is a side view showing a state in which an end part of a capacitor element is soaked into a conductive paste in the dip coating process for forming the electrodes, in the process of manufacturing the capacitor;

FIG. 4 is a side view of a capacitor having the electrodes formed, in the process of manufacturing the capacitor;

FIGS. (5a–5b) are a longitudinal sectional view showing another example of a capacitor according to the present invention;

FIGS. (6a–6b) are longitudinal sectional view showing another example of a capacitor according to the present invention;

FIG. 7 is a longitudinal sectional view showing another example of a capacitor according to the present invention;

FIG. 8 is a longitudinal sectional view showing another example of a capacitor according to the present invention;

FIG. 9 is a longitudinal sectional view showing another example of a capacitor according to the present invention;

FIGS. (10a–10b) are longitudinal sectional view showing a state of the process of manufacturing the capacitor;

FIGS. (11a–11b) are perspective view showing a capacitor element in the example of the capacitor and a capacitor as a finished product;

FIG. 12 is a longitudinal sectional view showing a conventional example of a capacitor; and FIG. 13 is a side view of a capacitor having the electrodes formed, in the process of manufacturing a capacitor of the conventional example;

DESCRIPTION OF THE PREFERRED EMBODIMENT

Preferred embodiments of the present invention will hereafter be described concretely in detail with reference to the accompanying drawings.

Figure 1:
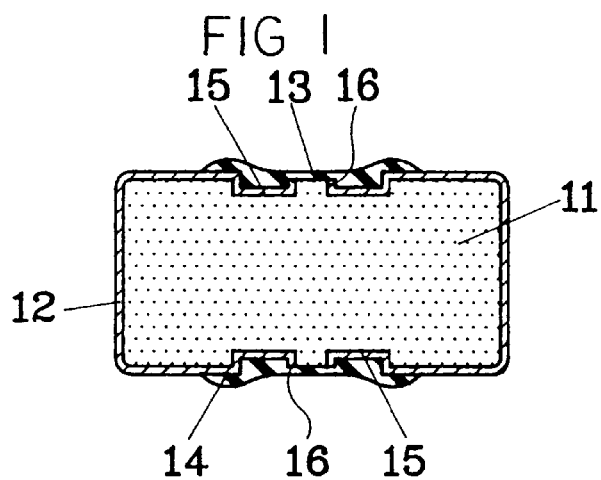
FIG. 1 is a longitudinal sectional view showing an example of a capacitor according to the present invention.

FIG. 1 illustrates an example of a capacitor according to the present invention. A capacitor element 11 shown in the drawing is made of a dielectric substance or the like and formed into a cylindrical shape. On the center of the circumference, a gap 13 is formed in a belt so as to be enclosed by two lines of rectangular recessed parts 15, 15, and rising surfaces nearer to the gap 13 are served as step parts 16, 16.

Electrodes 12, 12 made of a conductor film of silver, zinc, nickel, copper, palladium, or alloy of these metals are formed on the whole surface of the capacitor element 11 except the circumference in a belt being the gap 13 enclosed by the recessed parts 15, 15. These electrodes 12, 12 are separated by the gap 13. In other words, edges of a pair of the electrodes 12, 12 are opposed to each other with the gap 13 placed therebetween. The electrodes 12, 12 are formed also on the step parts 16, 16. The electrodes 12, 12 on the step parts 16, 16 are opposed in a plane so as to interpolate a dielectric substance of the width of the gap 13 therebetween.

Further, an insulating coating 14 made of an insulating material such as an epoxy resin is formed on the central circumference of the capacitor element 11, and the recessed parts 15, 15 and the gap 13 are overlaid with the insulating coating 14.

The outer parts of the electrodes 12, 12 except the part overlaid with the insulating coating 14 are served as terminal electrodes for connecting this capacitor to the circuits and the like. The nickel plating, tin plating, solder plating, or the like can be applied to the parts of the terminal electrodes in order to improve solderability. Further, metal caps can be fitted into the parts.

Figure 2A:
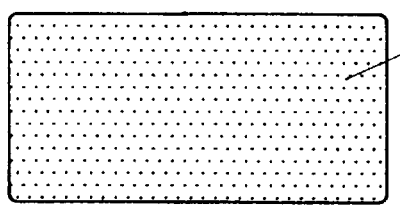
Figure 2B:
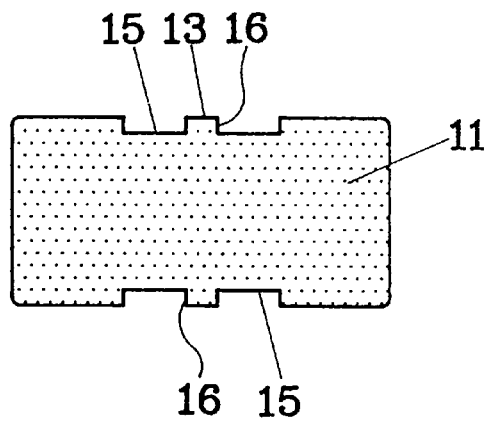
Figure 2C:
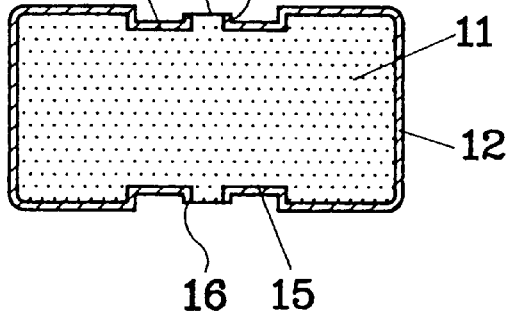

This type of capacitor is manufactured in the following process. First, the cylindrical capacitor element 11 made of a dielectric substance, as shown in FIG. 2 (a), is prepared. Next, the circumference of the capacitor element 11 is cut by a cutter or by the laser cutting, thus forming the recessed parts 15, 15 as shown in FIG. 2 (b). Or, not by cutting, the capacitor element 11 having the recessed parts 15, 15 as shown in FIG. 2 (b) may be obtained by molding.

Next, a conductive paste is applied to the circumferences and edge surfaces from the step parts 16, 16 being the rising surfaces of the recessed parts 15, 15 to both the ends, except the part of the gap 13 enclosed by the recessed parts 15, 15. The application of the conductive paste is generally conducted by the so-called dip coating method, in which, as shown in FIG. 3, the end part of the capacitor element 11 is soaked into a conductive paste a and then is pulled up to drip down an excessive conductive paste. In this case, one end side of the capacitor element 11 is soaked into the conductive paste a, serving the foregoing step parts 16 as a guide; the same is performed on the other end side. And even if the one end side of the capacitor element 11 is soaked into the paste a slightly deeper than the liquid surface of the conductive paste a, the conductive paste a is interrupted at the step part 16 by the surface tension of the conductive paste a. Accordingly, the conductive paste a does not wet the side of the gap 13 any further, and the gap 13 partitioned by the step parts 16, 16 can always be formed with a specific width.

Thereafter, the conductive paste a is dried and baked to be formed into the electrodes 12, 12 as shown in FIG. 2 (c). FIG. 4 illustrates an outlook of a state that the electrodes 12, 12 are formed.

Thereafter, an insulating varnish such as an epoxy resin is applied on the central circumference of the capacitor element 11 and the insulating vanish is hardened, and thereby the insulating coating 14 is formed as shown in FIG. 1. When the insulating vanish is coated on the central circumference of the capacitor element 11, the insulating vanish is flown into the recessed parts 15, 15; and therefore, the insulating vanish does not swell extremely from the circumference of the capacitor element 11.

Figure 5A:
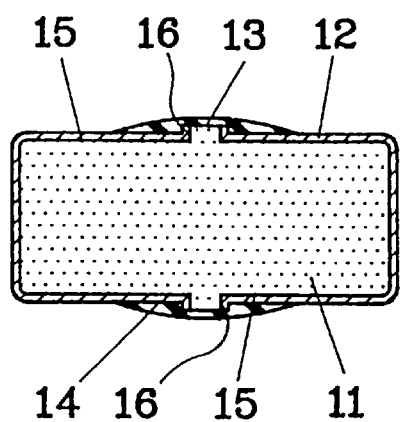
Figure 5B:
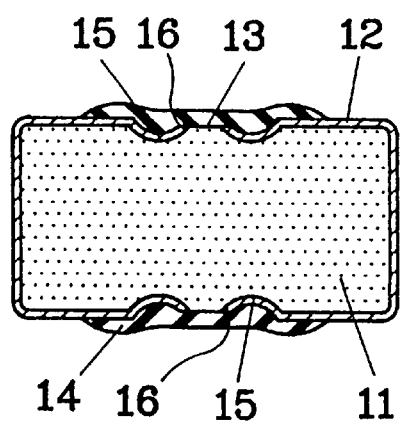

FIG. 5 illustrates another example of a capacitor according to the invention. FIG. 5 (a) illustrates one in which both of the end sides except the gap 13 are made into a thinner diameter, which are served as the recessed parts 15, 15 as a whole. Rising walls of the recessed parts 15, 15 on both the sides of the gap 13 are served as the step parts 16, 16, and the electrodes 12, 12 made of the conductor film are formed on the circumferences from the step parts 16, 16 toward both the ends, which is substantially the same as the foregoing example. FIG. 5 (b) illustrates another one in which the recessed part 15 is formed into a circular plane. Rising walls of the recessed parts 15, 15 on both the sides of the gap 13 are served as the step parts 16, 16, and the electrodes 12, 12 made of the conductor film are formed on the circumferences from the step parts 16, 16 toward both the ends, which is substantially the same as the foregoing example. However, the slopes of the step parts 16, 16 become slightly slow, which slightly reduces the effect to interrupt the conductive paste a when coating the conductive paste a on the end parts of the capacitor element 11 by the dip coating method as mentioned above. However, since the viscosity of the conductive paste a is high, this type of the recessed part 15 can obtain almost the same function and effect as the foregoing.

FIG. 6 further illustrates another example of a capacitor according to the invention. In FIG. 6 (a), the step parts 16, 16 almost perpendicular to the circumferences of the capacitor element 11 are formed on both the sides of the part served as the gap 13. The recessed parts 15, 15 are formed such that the diameters thereof are tapered to increase gradually toward both the ends from the step parts 16, 16. The electrodes 12, 12 made of the conductor film are formed on the circumferences toward both the ends from the step parts 16, 16 being the rising walls of the recessed parts 15, 15 on both the sides of the gap 13, which is substantially the same as the foregoing example.

In FIG. 6 (b), the recessed part 15 is made thinner and deeper. In this case, the recessed parts 15, 15 are filled with conductors served as the electrodes 12, 12. Since the recessed parts 15, 15 are made deeper to give wider areas to the step parts 16, 16, the opposed area by the electrodes 12, 12 becomes wider, so that a higher capacitance can be obtained.

FIG. 7 illustrates another example of a capacitor according to the invention. In the foregoing examples, the capacitor elements 11 each take the cylindrical shape. In this example, however, a plate capacitor element 11 is employed, and on one side are formed the recessed parts 15, 15, of which rising surfaces are served as the step parts 16, 16. And, the electrodes 12, 12 made of the conductor film are formed on the one side from the step parts 16, 16 toward both the ends.

FIG. 8 illustrates another example of a capacitor according to the invention. This example has a common construction as a whole to the capacitor shown in FIG. 1. The difference lies in that the capacitor element 11 is provided with recessed parts 17, 17 having the section tapered in the character V. The other points are the same as the capacitor shown in FIG. 1.

The recessed parts 17, 17 are served as supporting points on which the capacitor element 11 is supported and rotated, when the capacitor element 11 is coated with the conductive paste by the transfer roller on the circumference thereof. Thereby, the capacitor element 11 can turn stably about the rotating center, which can make the electrodes 12, 12 of a desired thickness.

Further, the reference symbol 14 in FIG. 5 through FIG. 8 shows the insulating coating, which is substantially the same as the one in FIG. 1.

Figure 10A:
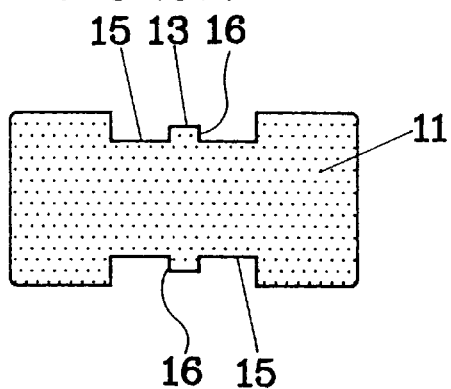
Figure 10B:
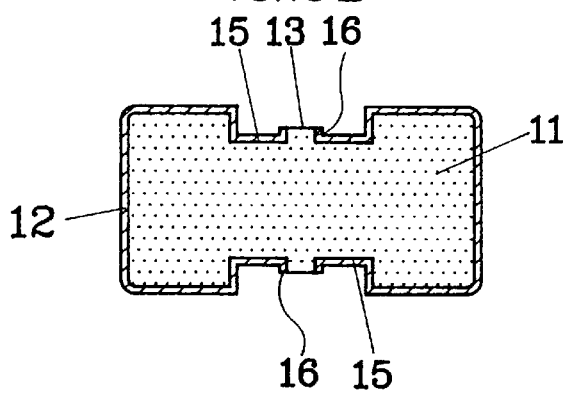
Figure 11A:
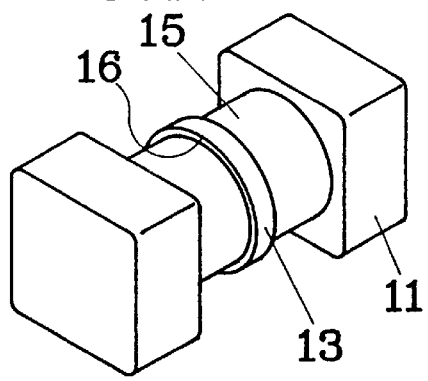
Figure 11B:
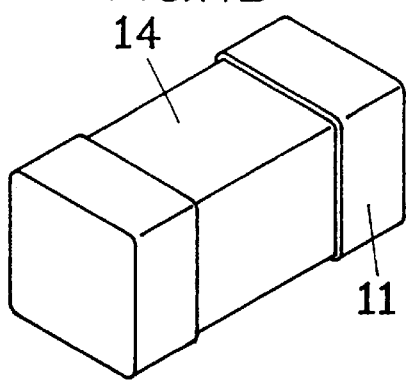

FIG. 9 through FIG. 11 illustrate other examples of capacitors according to the invention. In the example shown in FIG. 11 (a), the capacitor element 11 is provided with rectangular end parts, cylindrical recessed parts 15, 15 on the center, the gap 13 and the step parts 16, 16 between the recessed parts 15, 15.

In a state shown in FIG. 10 (a) or FIG. 11 (a), the recessed parts 15, 15 are coated with the conductive paste, and dried and baked; thereby forming the electrodes 12, 12 as shown in FIG. 10 (b). Thereafter, the electrodes 12, 12 are covered with the insulating coating 14, as shown in FIG. 9, thereby completing a capacitor. In the example shown in FIG. 11 (b), the insulating coating 14 of the capacitor is formed into a rectangular shape, and thereby, the outlook of the finished capacitor assumes a rectangular columnar shape as a whole as shown in FIG. 11 (b).

Next, a more concrete example of the invention will be described with concrete data.

First, a cylindrical capacitor element 11 made of barium titanate was prepared, whose diameter and length were 1.0 mm and 1.6 mm, respectively. The circumference was cut out so as to leave a central circumference in a belt of 0.1 mm in width, served as a gap 13. Recessed parts 15, 15 having a rectangular concave section were formed on both the sides of the gap 13. The depth of the recessed parts 15, 15 was made in three types, 0.1 mm, 0.2 mm, and 0.3 mm, and the samples were prepared in 30 pieces each. Further, the circumference was cut out so as to leave a central circumference in a belt of 0.5 mm in width, served as a gap 13. Recessed parts 15, 15 having a rectangular concave section were formed on both the sides in the depth of 0.1 mm, 0.2 mm, and 0.3 mm. The samples were also prepared in 30 pieces each.

The end parts of these samples of the capacitor element 11 were soaked into the conductive paste a, as shown in FIG. 3, thereafter pulled up, excessive conductive paste a were dropped off by the gravity, and thereafter adhered conductive paste a was dried and baked to form the electrodes 12, 12. Here, silver paste was used as the conductive paste a.

The electrodes 12, 12 thus formed were observed, and the result found that the conductor films forming the electrodes 12, 12 were formed on the circumferences from the step parts 16, 16 being the rising surfaces on both the sides of the gap 13 through both the ends, and the gap 13 was precise in 0.1 mm and 0.05 mm.

Thereafter, the capacitor elements 11 were coated with an epoxy resin on the central circumference so as not to coat both the ends of the capacitor element 11, thus forming the insulating coatings 14, and all the samples of the capacitor were made complete.

The capacitances of these capacitors were measured, and the averages and dispersions in each of 30 pieces were calculated. For comparison, the capacitor elements 1 of the same material and the dimension except that the recessed parts 15, 15 are not provided were prepared. In the same manner as the foregoing, the electrodes 2, 2 of 30 pieces each were formed so as to leave the gap 3 of 0.1 mm and 0.05 mm wide, and the insulating coatings 4 were applied to complete the capacitors. The capacitances of these capacitors were measured in the same manner as mentioned above, and the averages and dispersions in each of 30 pieces were calculated.

The results of these experiments are shown in Table 1 and Table 2. Table 1 shows the averages and dispersions of the measured capacitances in case the width of the gap 13, 3 is 0.1 mm wide, and Table 2 shows the averages and dispersions of the measured capacitances in case the width of the gap 13, 3 is 0.05 mm wide. Here, the averages of the capacitances represent capacitance ratios when the average of the capacitances of the capacitors in the comparison example not having the recessed parts 15, 15 is regarded as 1.00.

TABLE 1

|  | gap width | depth of step part | capacitance ratio | dispersion |
|---|---|---|---|---|
| example 1 | 0.1 mm | 0.1 mm | 1.9 | 1.8 |
| example 2 | 0.1 mm | 0.2 mm | 2.6 | 1.6 |
| example 3 | 0.1 mm | 0.3 mm | 3.1 | 1.4 |
| comparison example | 0.1 mm |  | 1.0 | 2.0 |

TABLE 2

|  | gap width | depth of step part | capacitance ratio | dispersion |
|---|---|---|---|---|
| example 1 | 0.05 mm | 0.1 mm | 2.4 | 2.7 |
| example 2 | 0.05 mm | 0.2 mm | 3.5 | 2.4 |
| example 3 | 0.05 mm | 0.3 mm | 4.2 | 2.1 |
| comparison example | 0.05 mm |  | 1.0 | 3.0 |

As clearly seen from the above Table 1 and Table 2, the capacitors having the step parts 16, 16 in the embodiment have higher capacitances compared to those of the comparison example not having the step parts, and the capacitances become higher as the depth of the step part 16 is made deeper. Therefore, changing the depth of the step part 16 will change the capacitance acquired. Further, it was confirmed that the width of the recessed parts 15, 15 hardly gave influence to the capacitances. It is conceivable that the capacitance is almost determined by the opposed edges of the electrodes 12, 12 and the step parts 16, 16.

Further, the capacitors having the step parts 16, 16 in the embodiment have lower dispersions of the capacitances compared to those of the comparison example not having the step parts. The reason lies in that the width of the gap 13 between the electrodes 12, 12 can be made constant. Naturally, forming the width of the gap 13 narrower makes the gap between the opposed electrodes 12, 12 narrower, which will increase the capacitance.

Further, a soldering test was carried out, in which 10,000 pieces of capacitors according to the foregoing example were mounted on circuit boards, and the result found that the bad soldering contact was none. In contrast to that, the conventional capacitor not having the step parts has been creating the bad soldering contact in the rate of 10 ppm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A capacitor having at least a pair of electrodes made of a conductor film, formed so as to interpolate a gap therebetween on surfaces of a capacitor element; the capacitor comprising:

step parts formed such that the surfaces of the capacitor element drop down on both sides of the gap; and the electrodes made of the conductor film that are placed on both the sides of the step parts so as to be opposed with the gap interpolated therebetween.

2. A capacitor as claimed in claim 1, wherein the step parts are formed by rising surfaces of recessed parts formed on the surfaces of the capacitor element.

3. A capacitor as claimed in claim 1, wherein the electrodes made of the conductor film are formed on the step parts.

4. A capacitor as claimed in claim 1, wherein the capacitor element is columnar, and the step parts are formed on the surfaces of the capacitor element.

5. A capacitor as claimed in claim 4, wherein recessed parts are formed on centers of both end faces of the capacitor element.

6. A capacitor as claimed in claim 1, wherein the capacitor element is of a plate, and the step parts are formed on the surfaces of the capacitor element.

* * * * *